Figure 1:
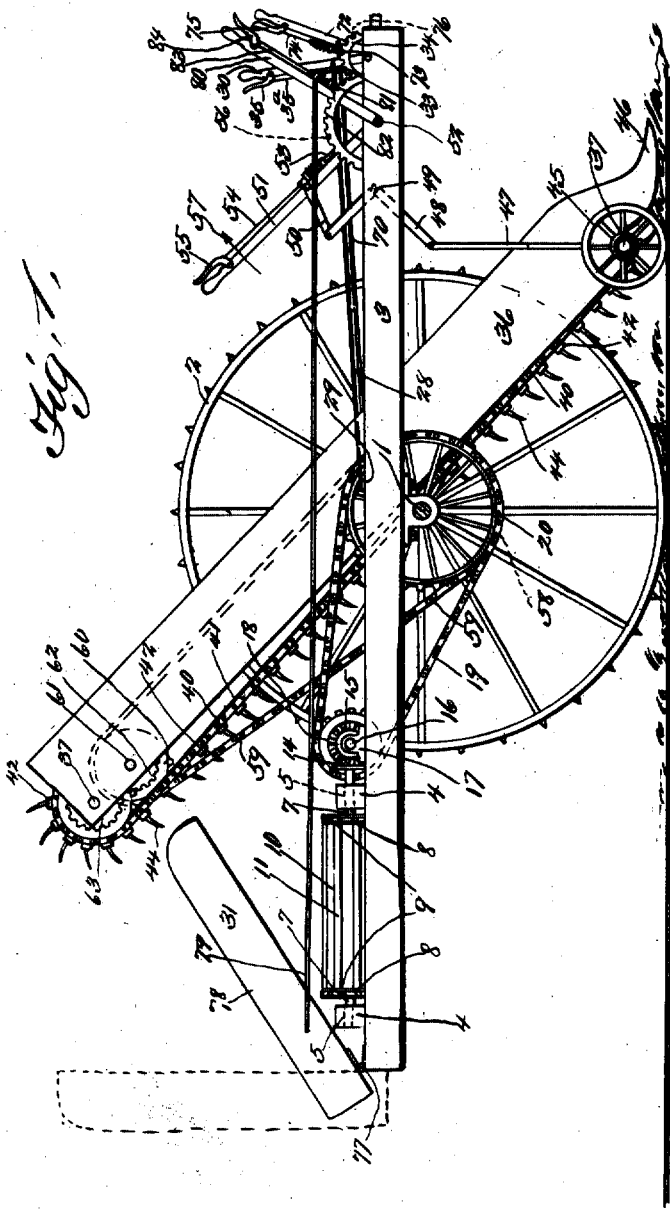

S. ROOSA.
HARVESTER FOR BEANS, PEAS, AND THE LIKE.
APPLICATION FILED APR. 10, 1911.

1,001,168.

Patented Aug. 22, 1911.
3 SHEETS—SHEET 3.

Witnesses
Francis G. Boswell
Mark LeGrange

Inventor
Samuel Roosa
By D. Swift &c.
Attorney

UNITED STATES PATENT OFFICE.

SAMUEL ROOSA, OF OWOSSO, MICHIGAN.

HARVESTER FOR BEANS, PEAS, AND THE LIKE.

1,001,168.  Specification of Letters Patent.  Patented Aug. 22, 1911.

Application filed April 10, 1911. Serial No. 620,189.

*To all whom it may concern:*

Be it known that I, SAMUEL ROOSA, a citizen of the United States, residing at Owosso, in the county of Shiawassee and State of Michigan, have invented a new and useful Harvester for Beans, Peas, and the Like; and I do hereby declare the following to be a full, clear, and exact description of the invention, such as will enable others skilled in the art to which it appertains to make and use the same.

This invention relates to a new and useful harvesting machine, especially adapted for collecting beans, peas and other similar vegetables.

The invention in its broadest scope aims as its primary object to provide a fulcrum frame having an endless elevating conveyer for gathering the beans, peas and the like. When the beans, peas or the like are gathered, they are conveyed upwardly to the rear of the machine or to one side thereof. The object of conveying the beans to the rear, is to drop them in the rear of the machine when traveling down two rows of beans $a'$, in the direction of the arrow $a$, (see Figure 5). The object in conveying the beans, peas or the like to one side of the machine is to deposit them on the rows $a'$ when traveling in the direction of the arrow $b$ down the two rows of beans $b'$. When leaving the two rows of beans $b'$, the machine travels in the direction of the arrow $c$ down the rows of beans $c'$. It will be observed when the machine is traveling in the direction of the arrow $c$, the beans are also deposited on the rows $a'$.

A further object of the invention is the production of means for raising and lowering the lower forward end of the fulcrumed frame.

In the drawings, however, there is only disclosed one form of the invention, but in practical fields, this form may require alteration, to which the applicant is entitled, provided the alterations are comprehended by the appended claims.

The invention comprises further features and combination of parts, as hereinafter set forth, shown in the drawings, and claimed.

Figure 2:
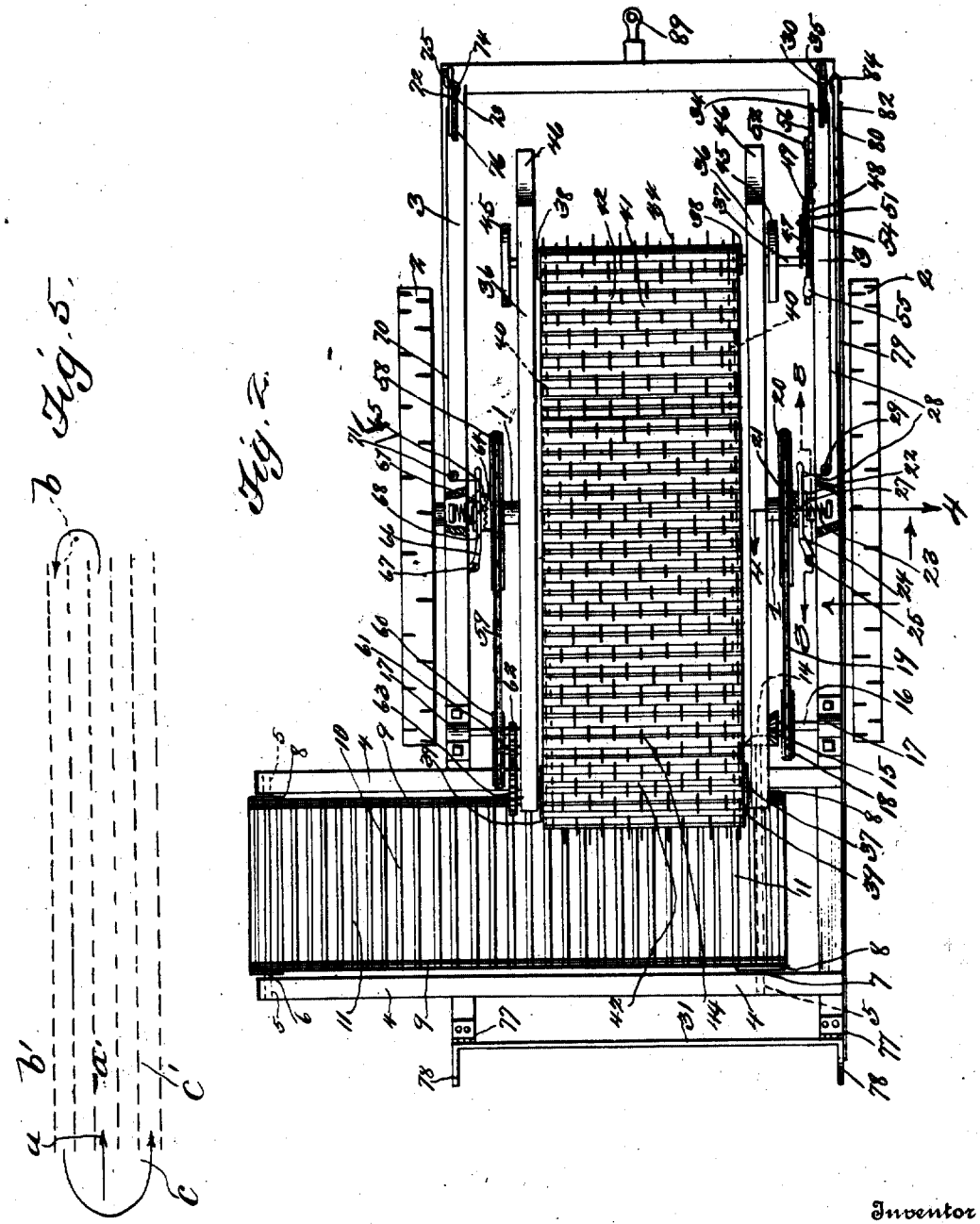
Figure 3:
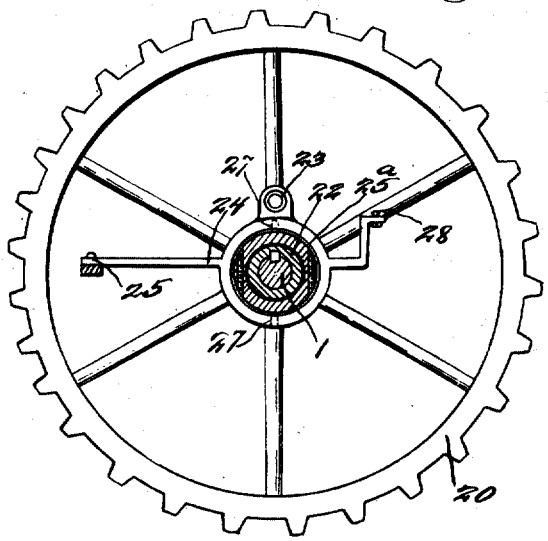
Figure 4:
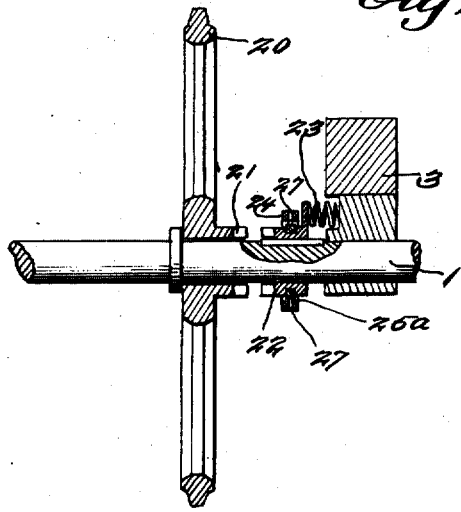

In the drawings:—Fig. 1 is a view in side elevation of a bean harvesting machine, constructed in compliance with the invention. Fig. 2 is a plan view of the machine. Fig. 3 is a sectional view on the line 3—3 of Fig. 2. Fig. 4 is an enlarged detail view. Fig. 5 is a view, showing the travel of the machine when gathering the beans, whereby six rows of beans may be gathered and deposited in a single row.

As to the annexed drawings, 1 designates the main axle or shaft of the machine, upon each end of which a traction wheel 2 is fixed. By these wheels power is transmitted to the shaft or axle 1. Fulcrumed upon the shaft or axle 1 is the main frame 3, which is rectangular in plan view, and running at right angles to this frame, in the rear thereof is a pair of beams 4. In the bearings 5 of these beams 4 shafts 6 and 7 are mounted. Rotatable with the shafts 6 and 7 are the sprocket wheels 8, over which the chains 9 travel. These chains 9 are connected by an endless belt conveyer 10, which is constructed of slats 11 so that the vines may be conveyed to one side, and while being so conveyed, the dirt and stones are given a chance to fall through the slats. By virtue of the conveyer 10, the beans, peas or other vegetables may be conveyed to one side of the machine, so as to be deposited on the rows of beans $a'$.

The shaft 7 is extended to one side at one end, and is provided with a beveled gear 14, which is in mesh with a bevel gear 15 carried by the shaft 16 (which extends at right angles to the frame 3) and mounted in bearings 17. This shaft 16 extends parallel to the conveyer 10, as shown in the plan view of the drawings. Rotatable with the shaft 16 is a sprocket 18, about which the chain 19 travels. The chain 19 also travels about a sprocket 20 loosely mounted upon the shaft 1. A clutch member 21 is carried by the sprocket 20, adapted to be coöperated with by the clutch member 22, which is keyed to rotate with the shaft 1. Although the clutch member 22 is keyed to rotate with the shaft 1, the same may be moved longitudinally on the shaft against the action of the spring 23, so as to allow the shaft to move idly in the sprocket wheel 20. To move the clutch member 22 on the shaft, a lever 24 is provided, which is pivoted as at 25. This lever 24 has an opening therein designated as at 25ª. Extending into the opening is the clutch member 22, which is pivoted to the lever by means of the pins 27. Attached to the free end of the lever 24 is a rope or cable 28 which passes about the pulleys 29, and is connected to the lever 30. By means of this lever 30, the lever 24 may be operated in such wise as to disengage the clutch member 22 from the clutch member 21, thereby throwing the sprocket wheel 20 out of operation, which in turn permits the conveyer 10 to remain idle, when it is desired to utilize the chute 31, which conveys the beans, peas or other vegetables into the receptacle 32. The lever 30 has a dog 33 to coöperate with the teeth of the quadrant 34. To manipulate the dog 33, the lever 30 is provided with a hand grip, which is connected to the dog by means of the rod 35.

Fulcrumed upon the shaft 1 is a supplemental frame 36 in each end of which a shaft 37 is mounted. Rotatable with the shafts 37 are the sprockets 38 and 39, about which the chains 40 travel. A conveyer belt 41 comprising the slats 42, which are carried by the chains 40, and projecting from the slats of the conveyer are the curved fingers 44, which constitute means for holding the beans, peas or the like upon the conveyer, while being elevated. The conveyer 41 extends on an incline upwardly and has its rear end disposed over approximately the central portion of the conveyer 10, so that the beans, peas or other vegetables may be transported to the conveyer 10.

On the ends of the lower shaft 37 caster wheels 45 are journaled, which are designed for the purpose of supporting the frame 36 the required distance above the surface of the ground. The lower forward ends 46 of the sides of the frame 36 are pointed and slightly extended, thus acting as means for guiding the beans, peas, or other vegetables to the conveyer 41.

Connected to the lower forward shaft 37 is a link 47, the upper end of which is connected to one arm of the bell crank lever 48, which is pivoted at 49. To the other arm of the bell crank lever a link 50 is connected, which in turn is connected to the lever 51, which is pivoted at 52. This lever 51 is provided with a dog 53, to which a rod 54 is connected. The rod 54 in turn is pivoted to a hand grip 55, by which the dog 53 may be manipulated, so as to throw it out of engagement with the teeth of the quadrant 56. By throwing the lever 51 in the direction of the arrow 57, the lower end of the frame 36 may be raised, so as to dispose the frame into inoperative position.

Loosely journaled upon the shaft 1 opposite the sprocket wheel 20 is a sprocket wheel 58, about which a chain 59 travels, which in turn passes about the sprocket 60, which is mounted upon the shaft 61, journaled in bearings of the frame 36. Also carried so as to rotate with the shaft 61 is a gear 62, which meshes with a similar gear 63, upon one end of the upper shaft 37. By means of the sprocket 58, the chain 59 and the sprocket 60, the gears 62 and 63, power may be transmitted to the conveyer 41, that is, when the sprocket 58 is clutched to rotate with the shaft 1. The sprocket 58 is provided with a clutch member 64, and keyed to rotate with the shaft 1, but slidable thereon is the clutch member 65, which is operated by the lever 66. This lever 66 is pivoted as at 67, and is provided with an opening 68 for the reception of the clutch member 65. Pins 69 constitute means for pivoting the lever 66 to the clutch member 65. Connected to the free end of the lever 66 is a rope or cable 70. This rope or cable 70 passes over the sheath 71, and is connected to a lever 72, which is provided with a dog 73. Connected to the dog 73 is a rod 74 which in turn is pivoted to a hand grip 75, adapted for the purpose of throwing the dog 73 into and out of engagement with the teeth of the quadrant 76. By throwing the lever 72 in one direction or the other the clutch member 65 may be thrown into or out of coöperation with the clutch member 64, when it is desired to throw the sprocket 58 into and out of operation with the shaft 1.

The chute 31 is hinged to the rear portion of the frame 3 as shown at 77. This chute 31 has side boards 78, and pivoted to one side of the chute 31 is a rod 79, the forward end of which is pivoted to a lever 80. This lever 80 is pivoted at the same point upon which the lever 51 is pivoted, and is provided with a dog 81 adapted to coöperate with the quadrant 82, so as to hold the lever 80 in adjusted position. To manipulate the dog 81, a rod 83 and hand grip 84 is provided, the rod 83 being connected to the hand grip as shown in side elevation of the drawings. By manipulating the lever 80, the chute 31 may be thrown under the rear end of the conveyer 41, so that the beans, peas or other vegetables may fall into the chute, and thence to the rear of the machine so as to fall at $a'$. After the rows of beans $a'$ have been gathered and deposited in the rear of the machine, the chute is thrown from under the conveyer 41, thus allowing the beans, peas or the like to fall upon the conveyer 10, by which they are transported to the side of the machine and deposited on the row $a'$, as the machine travels the rows $b'$ and $c'$, in the directions of the arrows $b$ and $c$, as shown in Fig. 5. The chute is shown in dotted lines in Fig. 2 as being thrown from under the conveyer 41.

From the foregoing, it will be observed that there has been devised, a novel, simple, efficient and practical harvester. The forward end of the frame 3 is designed to be connected to the rear of a bean or vegetable puller (not shown) by means of the eye 89.

The invention having been set forth, what is claimed as new and useful, is:—

1. In combination, a frame having traction wheels, a main conveyer tiltingly mounted therein for elevating vegetables, a secondary conveyer carried by the frame constructed and arranged with relation to the main conveyer for receiving the vegetables therefrom and conveying them to one side, a chute connected to the frame adapted to be swung under the main conveyer, so that the vegetables may be transported to the rear, and means for operating the conveyers from the wheels.

2. In combination, a frame having traction wheels, a main conveyer tiltingly mounted therein for elevating vegetables, a secondary conveyer carried by the frame constructed and arranged with relation to the main conveyer for receiving the vegetables therefrom and conveying them to one side, a chute connected to the frame adapted to be swung under the main conveyer, so that the vegetables may be transported to the rear; means for manipulating the chute, and means for operating the conveyers from the wheels.

3. In combination, a frame having traction wheels, a main conveyer tiltingly mounted therein for elevating vegetables, a secondary conveyer carried by the frame constructed and arranged with relation to the main conveyer for receiving the vegetables therefrom and conveying them to one side, a chute connected to the frame adapted to be swung under the main conveyer, so that the vegetables may be transported to the rear, means for tilting the main conveyer, and means for operating the conveyers from the wheels.

4. In combination, a frame having traction wheels, a main conveyer tiltingly mounted therein for elevating vegetables, a secondary conveyer carried by the frame constructed and arranged with relation to the main conveyer for receiving the vegetables therefrom and conveying them to one side, a chute connected to the frame adapted to be swung under the main conveyer, so that the vegetables may be transported to the rear, means for manipulating the chute, means for tilting the main conveyer, and means for operating the conveyers from the wheels.

5. In combination, a frame, a drive shaft mounted in bearings of the frame and provided with wheels, a main conveyer tiltingly mounted on the drive shaft, driving connections between the drive shaft and the main conveyer, a secondary conveyer mounted on the frame arranged at right angles to and under the rear upper end of the main conveyer for conveying vegetables therefrom and to one side, gear connections between the drive shaft and the secondary conveyer, a trough like chute pivoted to the rear of the frame beyond the secondary conveyer, and adapted to be swung under the main conveyer, so that vegetables may be transported to the rear, the chute when thrown under the main conveyer is inclined over the secondary conveyer, and a lever including a rod connection with the chute for manipulating the same.

6. In combination, a frame, a drive shaft mounted in bearings of the frame and provided with traction wheels, a main conveyer tiltingly mounted on the drive shaft, driving connections between the drive shaft and the main conveyer, a secondary conveyer mounted on the frame arranged at right angles to and under the rear upper end of the main conveyer for conveying vegetables therefrom and to one side, gear connections between the drive shaft and the secondary conveyer, a trough like chute pivoted to the rear of the frame beyond the secondary conveyer, and adapted to be swung under the main conveyer, so that vegetables may be transported to the rear, the chute when thrown under the main conveyer is inclined over the secondary conveyer, and a lever including a rod connection with the chute for manipulating the same, the main conveyer including a frame and provided with gage wheels at the forward lower portion, the frame of the harvester having a lever provided with connections between it and the main conveyer for tilting the same.

In testimony whereof I have signed my name to this specification in the presence of two subscribing witnesses.

SAMUEL ROOSA.

Witnesses:
A. D. WHIPPLE,
J. C. HOLDEN.